United States Patent
Yu et al.

(10) Patent No.: US 9,409,563 B2
(45) Date of Patent: Aug. 9, 2016

(54) PHEV ENERGY MANAGEMENT CONTROL WITH TRIP-ORIENTED ENERGY CONSUMPTION PREPLANNING

(71) Applicant: Ford Global Technologies, LLC, Dearborn, MI (US)

(72) Inventors: Hai Yu, Canton, MI (US); Qing Wang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 14/068,726

(22) Filed: Oct. 31, 2013

(65) Prior Publication Data

US 2015/0120107 A1    Apr. 30, 2015

(51) Int. Cl.
| | |
|---|---|
| B60W 20/00 | (2016.01) |
| B60L 11/12 | (2006.01) |
| B60L 11/18 | (2006.01) |
| B60L 3/12 | (2006.01) |

(52) U.S. Cl.
CPC ............. B60W 20/00 (2013.01); B60L 3/12 (2013.01); B60L 11/126 (2013.01); B60L 11/1816 (2013.01); B60L 11/1861 (2013.01); B60L 11/1862 (2013.01); B60W 20/12 (2016.01); B60L 2240/622 (2013.01); B60L 2240/645 (2013.01); B60L 2260/52 (2013.01); B60L 2260/54 (2013.01); B60Y 2400/214 (2013.01); Y02T 10/7005 (2013.01); Y02T 10/705 (2013.01); Y02T 10/7044 (2013.01); Y02T 10/7072 (2013.01); Y02T 10/7291 (2013.01); Y02T 90/14 (2013.01); Y02T 90/16 (2013.01); Y02T 90/162 (2013.01); Y10S 903/903 (2013.01)

(58) Field of Classification Search
None
See application file for complete search history.

(56) References Cited

U.S. PATENT DOCUMENTS

| | | | | |
|---|---|---|---|---|
| 5,487,002 | A * | 1/1996 | Diller et al. | 701/1 |
| 2005/0274553 | A1* | 12/2005 | Salman et al. | 180/65.2 |
| 2009/0030568 | A1* | 1/2009 | Amano et al. | 701/22 |
| 2009/0259363 | A1* | 10/2009 | Li et al. | 701/36 |
| 2011/0166731 | A1 | 7/2011 | Kristinsson et al. | |
| 2011/0166732 | A1 | 7/2011 | Yu et al. | |
| 2011/0172867 | A1 | 7/2011 | Yu et al. | |
| 2012/0326724 | A1* | 12/2012 | Park | 324/426 |

* cited by examiner

Primary Examiner — Mussa A Shaawat
Assistant Examiner — Abdhesh Jha
(74) Attorney, Agent, or Firm — David B. Kelley; Brooks Kushman P.C.

(57) ABSTRACT

A driving pattern based plug-in hybrid electric vehicle (PHEV) energy consumption preplanning process enables a PHEV trip-oriented energy management control (TEMC) to utilize scalable levels of available trip foreknowledge in order to optimize the onboard energy (fuel and electricity) usage. The preplanning process generates an optimal battery state-of-charge (SOC) depletion profile for a given trip to be traveled by a PHEV. The preplanning process may generate the battery SOC profile using a driving pattern based dynamic programming (DP) algorithm. The TEMC controls the onboard energy usage in accordance with the battery SOC profile, which is optimized for the trip. The preplanning process makes use of spatial domain normalized drive power demand (SNDP) (or S-NDP) distributions in which each set of distributions is indicative of a respective driving pattern. The trip foreknowledge is used to select the driving pattern best representative of the driving process for the trip.

5 Claims, 5 Drawing Sheets

PHEV ENERGY MANAGEMENT CONTROL WITH TRIP-ORIENTED ENERGY CONSUMPTION PREPLANNING

TECHNICAL FIELD

The present invention relates to controlling a plug-in hybrid electric vehicle (PHEV) with the intention of utilizing available battery power to minimize fuel consumption.

BACKGROUND

A plug-in hybrid electric vehicle (PHEV) has an engine and an electric motor. The energy source for the engine is fuel stored in the vehicle and the energy source for the motor is a battery of the vehicle. The battery has a relatively large charge storage capacity and is primarily rechargeable from the external electric grid. As much pre-saved battery energy as possible should be used before the next battery charge event; i.e., the relatively low cost grid supplied electric energy should be fully used for vehicle propulsion and other functions prior to the next charge event. The fuel economy of a PHEV can be improved when the onboard energy (fuel and electricity) usage is optimized (i.e., adapted) for the PHEV's trip. Optimization of energy usage to a trip is defined as the energy usage which minimizes fuel consumption for the trip. As such, minimizing fuel consumption per charge cycle may be attained when a PHEV is controlled while traveling during a trip in accordance with a battery state-of-charge (SOC) depletion profile optimized for the trip.

SUMMARY

An embodiment of the present invention provides a method for operating a vehicle. The method includes controlling battery usage of the vehicle according to a battery state-of-charge (SOC) profile based on a spatial domain normalized drive power (S-NDP) distribution of a driving pattern.

The method may include generating the SOC profile using dynamic programming with an energy consumption characteristic based on the S-NDP distribution.

The method may include selecting the driving pattern based on information associated with a trip of the vehicle. The driving pattern may be representative of each of a plurality of driving processes having similar S-NDP profiles. The driving pattern may be selected as being the selected driving pattern when the information associated with the trip is indicative of a driving process that is one of the plurality of driving processes. The method may further include generating a library of driving patterns, each driving pattern having a corresponding S-NDP distribution and each driving pattern associated with a driving process parameter. The selected driving pattern may be the driving pattern of the library of driving patterns having the driving process parameter which best corresponds to the information associated with the trip. Each driving pattern of the library of driving patterns may be representative of a set of driving processes having similar S-NDP profiles. The selected driving pattern may be selected as being the selected driving pattern when the information associated with the trip is indicative of a driving process that is one of the set of driving processes of the selected driving pattern.

The method may further include selecting a driving pattern for each portion of the trip of the vehicle based on information associated with each portion of the trip. Each driving pattern has a corresponding S-NDP distribution. The method may further include generating the battery SOC profile using dynamic programming with an energy consumption characteristic based on the S-NDP distribution of each selected driving pattern and each portion of the trip associated with the selected driving pattern.

The information of the trip may include at least one of static traffic information, dynamic traffic information, driver input information, driving history information, and vehicle state information.

Another embodiment of the present invention provides a system configured to carry out the method.

A further embodiment of the present invention provides another method. This method includes classifying a first set of driving processes having similar spatial domain normalized drive power (S-NDP) profiles as a first driving pattern. The first driving pattern has a corresponding S-NDP distribution based on the S-NDP profiles of the first set of driving processes. The method further includes classifying a second set of driving processes having similar S-NDP profiles different than the S-NDP profiles of the first set of driving processes as a second driving pattern. The second driving pattern has a corresponding S-NDP distribution based on the S-NDP profiles of the second set of driving processes. The method further includes selecting from the first and second driving patterns for a trip of a plug-in hybrid electric vehicle (PHEV) the driving pattern in which information associated with the trip is most indicative of a driving process that is one of the set of driving processes of the selected driving pattern. The method further includes generating a battery state-of-charge (SOC) profile using dynamic programming with an energy consumption characteristic based on the S-NDP distribution of the selected driving pattern and controlling battery usage of the PHEV during the trip according to the SOC profile.

In sum, an SOC profile is generated using dynamic programming based on energy consumption property. Energy consumption properties are respectively generated for the driving patterns. Each driving pattern has a S-NDP profile, which indicates its drive demand distribution. Each driving pattern also has an energy consumption property derived from the S-NDP profile. This property indicates how the energy consumption relationship is between the consumption rates of the on-board energy (i.e., fuel and electricity) when driving in such pattern.

As such, two general steps are as follows. First, the driving pattern construction includes the S-NDP profile and then the characteristic of the energy consumption property based on the profile. Second, energy usage optimization uses the energy consumption properties associated to selected patterns for a trip to generate the SOC profile. Thus, the SOC profile optimization is indirectly based on S-NDP. The energy consumption property is used for the dynamic programming optimization process. Beforehand, the energy consumption property for each driving pattern is obtained based on the S-NDP distribution.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present invention are directed to a driving pattern based plug-in hybrid electric vehicle (PHEV) energy consumption preplanning process that supports a PHEV trip-oriented energy management control (TEMC). The preplanning process aims to improve real world PHEV energy usage efficiency, economy, and flexibility. The preplanning process enables the TEMC to utilize scalable levels of available trip foreknowledge, from as limited as distance between recharges to as much as driving patterns, routing, and real time traffic information, in order to optimize the onboard energy (fuel and electricity) usage towards providing a more driver oriented, flexible, and economic driving experience.

In operation, the preplanning process generates an optimal battery state-of-charge (SOC) depletion profile for a given trip to be traveled by a PHEV. The preplanning process generates the battery SOC depletion profile using a driving pattern based dynamic programming (DP) algorithm. The battery SOC profile is to govern the energy consumption (fuel and electricity) of the PHEV along the trip. As such, the TEMC controls the onboard energy usage in accordance with the battery SOC profile, which is optimized for the trip. As detailed vehicle system and powertrain dynamics are not involved, the preplanning process is efficient and cost-effective in information accessibility and computational resource requirement while achieving validated fuel economy improvement performance.

Figure 1:
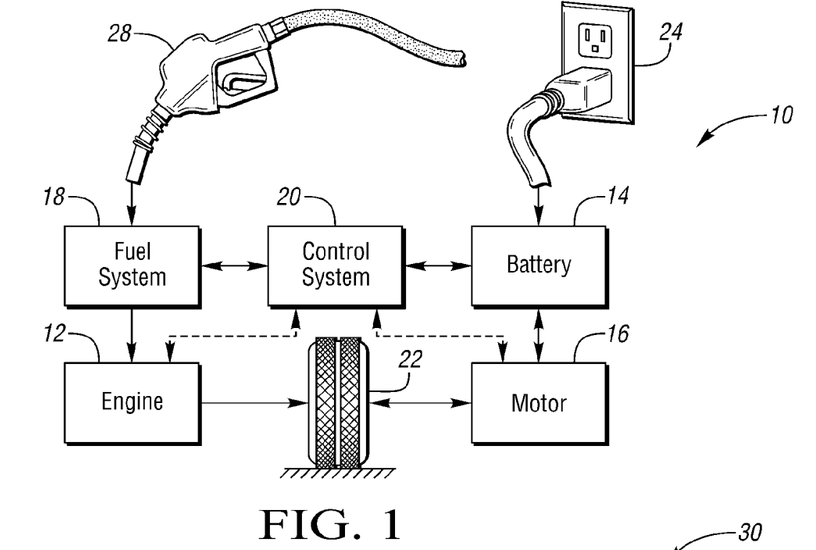
FIG. 1 illustrates a block diagram of a plug-in hybrid electric vehicle (PHEV) for use with embodiments of the present invention.

Referring now to FIG. 1, a schematic of a PHEV 10 for use with embodiments of the present invention is shown. PHEV 10 includes an engine 12, a battery 14, a motor 16, a fuel system 18, and a controller 20. Engine 12 is configured to consume a liquid fuel (e.g., gasoline) from fuel system 18 to produce an engine output to propel the vehicle via a drive wheel 22. Battery 14 is configured to output and receive electrical energy and store received electrical energy. Motor 16 is configured to consume electrical energy from battery 14 to produce a motor output to propel the vehicle via drive wheel 22. Battery 14 receives electrical energy from the external electric grid 24 during a recharging operation. Fuel system 18 periodically receives fuel from an external fuel source 28. In this way, PHEV 10 may be propelled by utilizing an energy source (e.g., electrical energy) in addition to the fuel.

Controller 20 may send control signals to and receive sensory feedback information from engine 12, battery 14, and motor 16. Controller 20 can identify the amount of electrical energy stored in battery 14 (i.e., the battery SOC). As such, controller 20 can control the operation of engine 12 and battery 14 in accordance with a SOC depletion profile such that the battery SOC tracks a corresponding target SOC of the SOC depletion profile.

As indicated above, minimizing fuel consumption per charge cycle may be attained when the battery of a PHEV traveling during a trip is controlled in accordance with a SOC depletion profile optimized for the trip.

As usage and driving styles vary from driver to driver, there is necessity and opportunity to further enhance the PHEV energy economy and flexibility by giving the driver more personalized energy management capability. The dynamic programming (DP) based energy management result cannot be implemented due to its non-causal nature. In order to achieve a near-global optimal energy management online with respect to real world driving schedules, a DP based control strategy has to be applied using the future speed profile or power demand profile predicted for an up-coming or on-going trip.

A successful prediction relies not only on a dynamic traffic model, but on the amount of available traffic information along the trip. Static traffic information like traffic lights and speed limits, dynamic traffic information like traffic flow, and driving history data shape a predictive driving profile. The more information obtained, the better the driving profile can be constructed and consequently the more meaningful result a DP based global optimal energy usage planning can achieve. However, trip foreknowledge is not easy to obtain. The greater the amount of information and the more predictive nature of the information, the higher cost on information access and processing computation resource. Furthermore, due to its preview nature, the longer the prediction is made into the future the less accurate and more uncertainty involved in the prediction.

A practical PHEV energy management control design should not aim to achieve the most optimal result, but to accomplish the highest fuel economy improvement with the most efficient and economic requirements on additional trip foreknowledge based on cost budget and information availability. As such, instead of processing excessive trip information to shape a vehicle speed profile, embodiments of the present invention provide a driving pattern based energy consumption preplanning process which enables a practical PHEV energy management control design.

A driving pattern as described herein is defined by characteristic distributions of the spatial domain normalized drive power demands (SNDP) (or S-NDP) which associate to certain types of driving styles irrespective of their time domain behaviors. By clustering wide-spread driving cycles (i.e., driving processes) to limited numbers of driving patterns, the preplanning process is flexible on trip foreknowledge availability. When abundant trip information is available, a trip can be finely partitioned and associated with a sequence of driving patterns with higher accuracy. When less trip information is used, the trip can be roughly associated to less accurate driving patterns. In the latter case, as the trip is roughly associated to less accurate driving patterns, the characteristic about how a driver drives along a trip is still captured to the extent that the available information can support. Furthermore, the preplanning process treats a continuous driving cycle associated to a single driving pattern as a unit. Thus, when applying dynamic programming (DP) to plan on future energy consumption for a sequence of driving patterns, the computational resources are largely saved because the programming algorithm is designed using driving pattern based energy consumption characteristics rather than involving any detailed vehicle system and powertrain dynamics.

Applying optimal control theory, a trip-oriented energy management control (TEMC) further optimizes the trip specific PHEV energy economy given scalable trip foreknowledge. The TEMC fills the gap between DP and rule based methods by providing a flexible and cost-effective control methodology that is able to optimize PHEV energy management control using scalable available trip information, from as limited to distance until charge (DUC) to as much as driving patterns, routing, and real time information.

The driving pattern (or trip-oriented) energy consumption preplanning process in accordance with embodiments of the present invention generates the optimized SOC depletion profile for a current or future trip to be traveled by a PHEV. As described above, controlling the PHEV in accordance with the optimized SOC depletion profile results in minimizing fuel consumption during the trip. In use, the generated SOC depletion profile is provided to a system domain optimization portion of the TEMC. The TEMC controls the PHEV according to the SOC depletion profile. As such, the preplanning process achieves the TEMC trip domain optimization. The preplanning process is also robust to prediction uncertainty and information noise factors as the driving pattern prediction applies a multi-channel information fusion methodology.

The trip domain driving cycle analysis and driving pattern development aspects of a driving pattern (or trip-oriented) based energy consumption preplanning process in accordance with embodiments of the present invention will now be described. Vehicle driving behavior and processes spread widely and their time domain outlooks are quite different from time to time and from driver to driver. In order to design an informative, flexible, and cost-effective optimization strategy, drivers' daily driving behaviors have to be categorized into limited types of driving styles. For different application purposes, driving patterns can be defined and constructed differently with different indexing parameters and physical meanings. Some standard methods use vehicle acceleration magnitude at vehicle speed set-points to define different patterns. In the preplanning process in accordance with embodiments of the present invention, such conventional driving patterns will be used only in short term energy planning. Instead, when studying long term driving styles, the driving pattern is defined as the characteristic probability distribution of the spatial domain normalized drive power demand (SNDP).

Figure 2A:
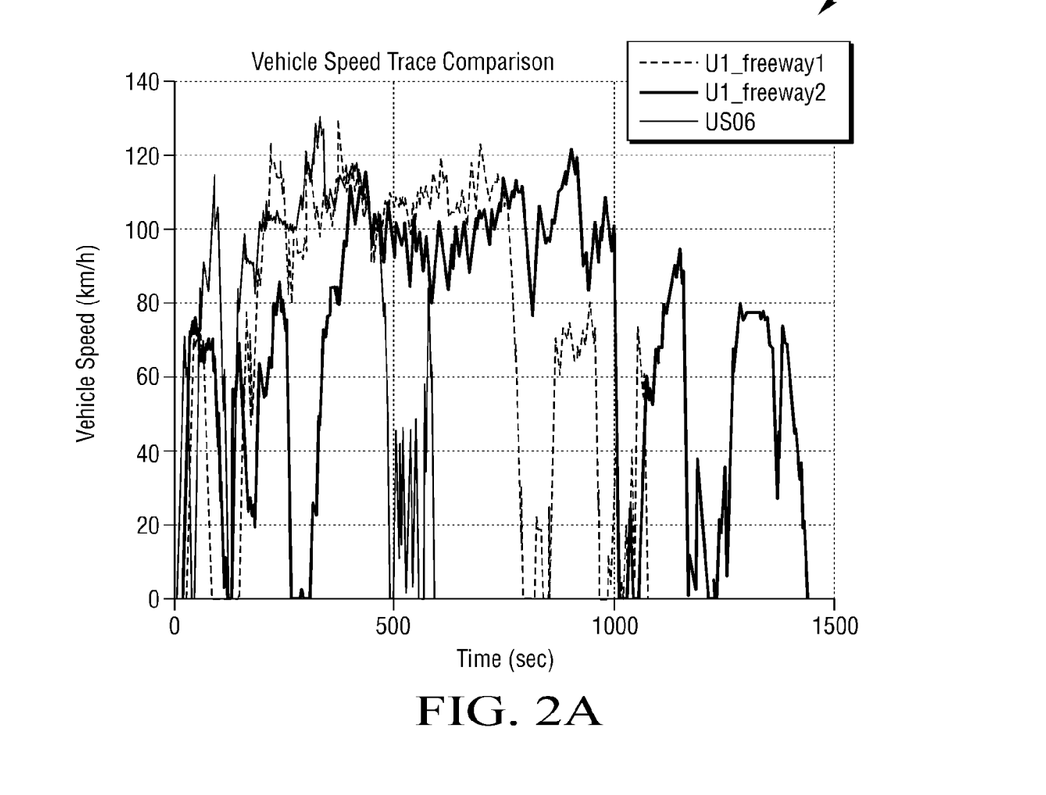
FIGS. 2A, 2B, and 2C respectively illustrate a vehicle speed trace comparison graph for freeway type of driving cycles, a drive power demand distribution graph for the freeway type of driving cycles, and a driving cycle SNDP distribution graph for the freeway type of driving cycles.
Figure 2B:
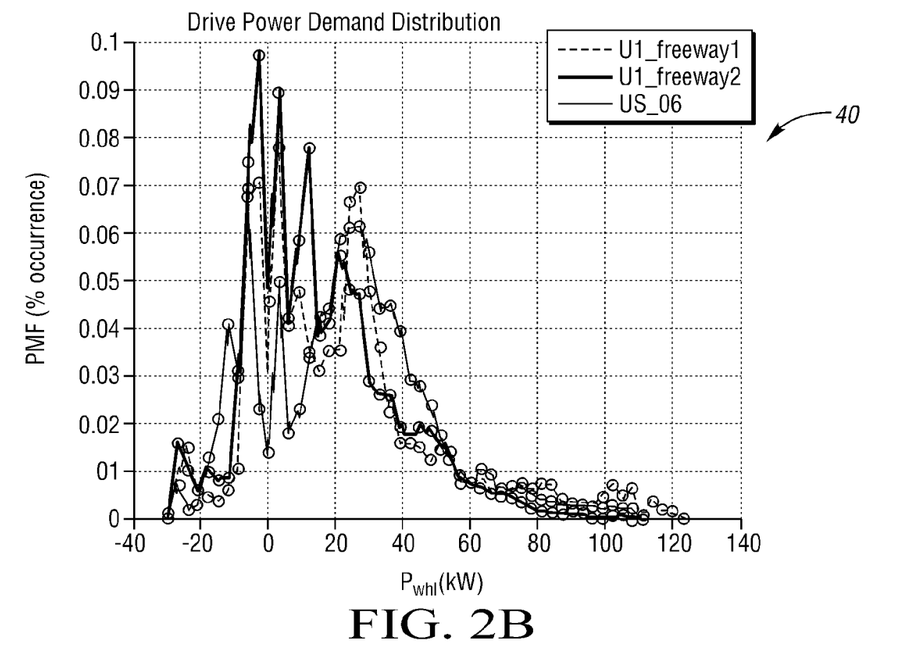
Figure 2C:
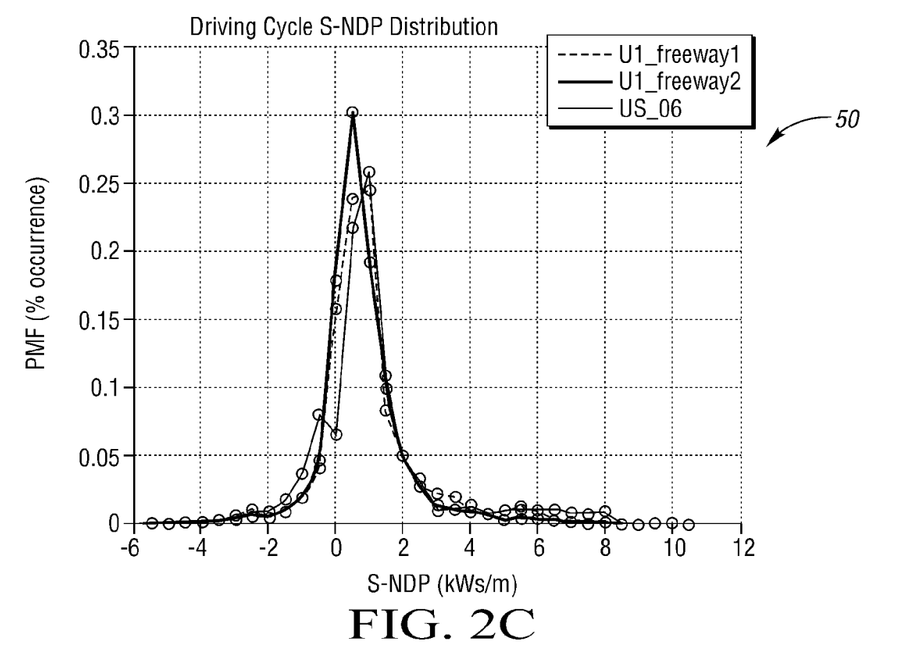

With reference to FIGS. 2a, 2b, and 2c, an example will be used to introduce the concept of defining a driving pattern as the characteristic probability distribution of the spatial domain normalized drive power demand (SNDP). In this regard, FIGS. 2a, 2b, and 2c respectively illustrate a vehicle speed trace comparison graph 30, a drive power demand distribution graph 40, and a driving cycle SNDP distribution graph 50. Vehicle speed trace comparison graph 30 of FIG. 2a is a plot of vehicle speed versus time of two freeway types of driving cycles (U1_freeway1; US_freeway2) and the standard US06 driving cycle. As such, FIG. 2a is indicative of a freeway type of driving comparison. Even though they can be regarded as similar from visual observation, it is hard to model how close these types of driving cycles are to each other.

Drive power demand distribution graph 40 of FIG. 2b is a plot of the Probability Mass Function (PMF) of the drive power demand $P_{whl}$ for each of the driving cycles (U1_freeway1; US_freeway2; and US06). As such, FIG. 2b is indicative of $P_{whl}$ distribution for freeway types driving cycles. However, there is still no clue to build a relationship among the driving cycles.

Instead, spatial domain analysis technique is applied to the drive power requests to explore the characteristics behind these random driving behaviors. When PMF of the spatial domain normalized drive power demand (SNDP) (or S-NDP) $P_{sndp}$ for all of the traces are plotted together as shown in driving cycle SNDP distribution graph 50 of FIG. 2c, it can be seen that these different driving cycles exhibit a consistent driving pattern to each other. As such, FIG. 2c is indicative of the SNDP for freeway types driving cycles.

The concept of SNDP (or S-DNP) is developed as follows: for a trip having p elements of interconnected driving patterns, the total propulsion energy demand can be evaluated by the following equation (1):

$$E_{prop} = \int_0^T P_{whl} dt = \int_0^{T_1} P_{whl}^1 dt + \cdots + \int_0^{T_p} P_{whl}^p dt$$
$$= T_1 P_{set \wp_1^\tau}^\tau (P_{set}) + \cdots + T_p P_{set \wp_p^\tau}^\tau (P_{set})$$
$$= \int_0^{S_1} P_{sndp}^1 ds + \cdots + \int_0^{S_p} P_{sndp}^p ds$$
$$= S_1 P_{set \wp_1^s}^{sn}(P_{set}^{sn}) + \cdots + S_p P_{set \wp_p^s}^{sn}(P_{set}^{sn})$$
$$= \int_0^S P_{sndp} ds$$

$P_{whl}$ is the time domain drive power demand. T is the total trip time duration. Variables with superscript i indicate the corresponding signals in the i-th element along the trip. Equation (1) translates the time domain energy consumption to the spatial domain where S is the distance until charge (DUC) and $P_{sndp}$ denotes the spatial domain normalized drive power:

$$P_{whl}^{sn} = \frac{P_{whl}}{V_{veh}}$$

℘ is the PMF with respect to a discrete time domain drive power set $P_{set}$ or a spatial domain normalized power set $P_{set}^{sn}$. The distribution of SNDP provides a way to characterize how drive power is statistically requested in certain driving styles. Together with the estimated distance, which represents how long the drive power is demanded continuously in a certain way, both the total propulsion energy consumption and the drive power at each distance step can be evaluated over period of driving in which driving behavior embedded with consistent style persists.

Applying the SNDP analysis to real world customer driving cycles, a library of driving patterns is established. The driving patterns are indexed with statistical parameters that are directly connected to available trip information. The concept of the driving pattern based energy planning technology is described herein. Detailed pattern construction and pattern library indexing methodologies are not the purview. Instead, the following analysis uses publicly available driving cycle data and several common customer driving cycles to demonstrate the driving pattern concept and control strategy. The candidate driving cycles used include: California Unified (CA), IM240, JPJC08, NYCC, CSC, FTP72, FTP75, JP-JE05, FTP-SC03, and UDDS for low speed driving cycles; HWYFET and NEDC2 (the high speed hill in standard NEDC cycle) for mild high speed drive; US06 for high speed freeway driving cycles; and a modified HWYFET drive cycle denoted by HWY80 to represent more aggressive high speed drive style. The speed profile of HWY80 is 1.4 times that of HWYFET cycle. A set of user cycles are also collected from five drivers' daily commuting trips. These cycles are named beginning with U1, U2, U4, U5, and Un and appended with different driving type base on range of speed variation. The SNDP distribution properties for each of the related groups of driving cycles can be plotted in similar manner to FIG. 2C and from such plots it can be seen that the driving cycles in each group exhibit a consistent driving pattern to each other.

Figure 3:
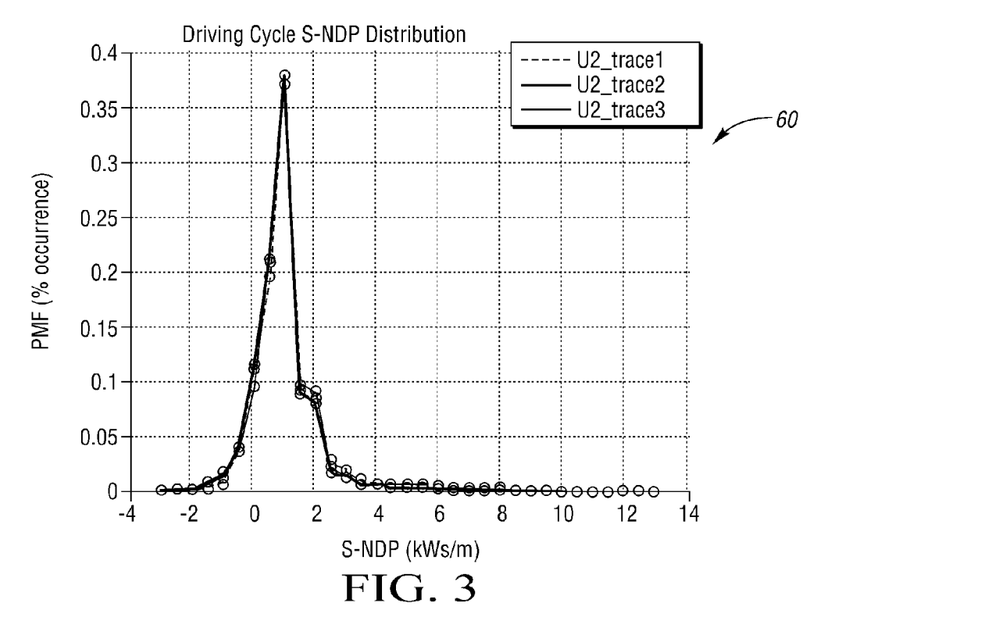
FIG. 3 illustrates a driving cycle SNDP distribution graph for three different days of the same commuting trip by a same user U2.

In order to illustrate the effectiveness of the SNDP based pattern classification, the SNDP distribution from three different days of user U2 driving traces are demonstrated in plot 60 of FIG. 3. It is seen that the same user exhibits consistent driving style when driving along the same route in different days commuting trips.

The SNDP distribution provides an effective mathematic model to capture the characteristics behind various driving behavior. A library of driving patterns are thus constructed utilizing both off-line and online pattern identification and classification algorithm over typical driving process and driving history data. However, the SNDP based driving patterns are not able to be used directly to predict future driving behavior.

Figure 4:
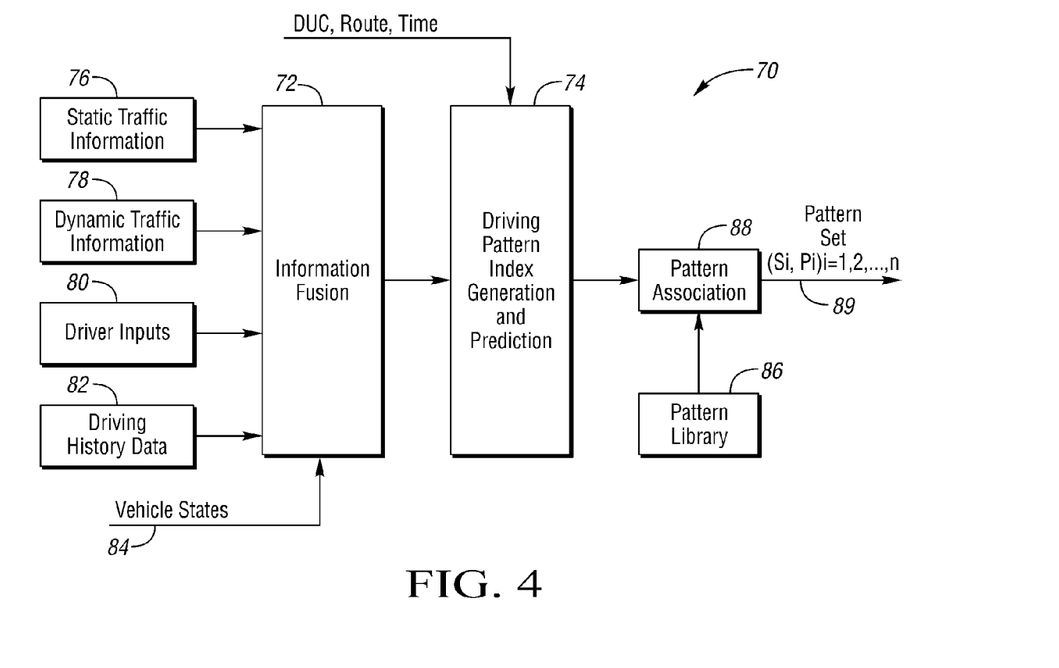
FIG. 4 illustrates a block diagram of a process configuration for a trip domain driving pattern prediction function of a driving pattern (or trip-oriented) based energy consumption planning control strategy in accordance with embodiments of the present invention.

To this end, the driving pattern based (or trip-oriented) energy consumption preplanning process in accordance with embodiments of the present invention employs a trip domain driving pattern identification function to connect the real world trip information to the classified driving patterns. FIG. 4 illustrates a block diagram of a driving pattern predictor 70 which provides the trip domain driving pattern identification function.

Driving pattern predictor 70 is part of a driving pattern based (or trip-oriented) energy consumption pre-planner 112 (shown in FIG. 6), which carries out the operation of the preplanning process. Driving pattern predictor 70 provides driving pattern prediction and association given information about a driving cycle or trip. Driving pattern predictor 70 includes an information fuser 72, a driving pattern index generator and predictor 74, a pattern library 86, and a pattern association block 88. Information fuser 72 synchronizes trip information from different information channels and generates a formatted driving information set. Such information channels include static traffic information 76, dynamic traffic information 78, driver inputs 80, driving history data 82, and vehicle states 84. Based on the time domain driving information set and the trip route, driving pattern index generator and predictor 74 computes and assigns a sequence of driving index parameters to consecutive portions of a trip.

The mathematical model of the driving index represents distinguishing characteristics of different driving styles. Through the driving index parameter, individual driving patterns from driving pattern library 86 are associated by pattern association block 88 to each portion of the trip. Output 89 is indicative of the driving patterns respectively associated with the portions of the trip. The construction of the driving information set is flexible with respect to trip foreknowledge availability. The more trip information used, the finer the pattern sequence and the more accurate the representing driving patterns associated along the trip.

Furthermore, trip foreknowledge is not equally available along the trip. Usually, a driver's driving behavior can be reliable predicted from seconds to a few minutes given sufficient traffic and route information. In this small scale, conventional vehicle speed and acceleration based driving pattern can be used to enable short term optimal control or MPC based PHEV energy usage planning and management. The further into the future, the less is the dependability and availability of the trip information. Thus, an element trip sequence can only be associated to driving patterns that statistically capture styles of driving behavior. For example, given only knowledge of duration of freeway driving at normal traffic condition, a future portion along a trip can only be identified as typical mild freeway driving pattern. On the other hand, when the amount of entrances/exits, traffic flow and congestion condition, number of surrounding vehicles, distance to front vehicle, etc. are known, vehicle acceleration and deceleration pattern can be well constructed.

In one way, the driving pattern based energy consumption preplanning process in accordance with embodiments of the present invention supports a short range micro-planning plus long range macro-planning energy consumption optimization scheme. In another way, the planned long term energy usage plan serves as cost-to-go metric for implementing MPC based short term optimal energy management control scheme.

Further aspects of the driving pattern based (trip-oriented) energy consumption preplanning process in accordance with embodiments of the present invention will now be described. The driving pattern based energy consumption property enables energy preplanning for individual trips using a dynamic programming (DP) based battery SOC profile generation algorithm.

After grouping selected driving cycles into driving patterns, the SNDP distribution based patterns are applied to PHEV energy management optimization. To this end, the spatial domain energy consumption property has to be analyzed with respect to each type of identified driving patterns.

An optimal solution to the PHEV energy management problem is the optimized power-split and power sourcing states that minimize a constantly indexed tradeoff function of the trip domain fuel consumption rate (FCR) and the battery electricity depletion rate (EDR) as:

$$[u^*(s), \omega^*_{eng}(s)] = \arg_{u, \omega_{eng} \in C} \min(\dot{m}_f^s - \lambda * S\dot{O}C^s)$$

$\dot{m}_f^s$ and $S\dot{O}C^s$ represent the trip domain fuel consumption rate and battery SOC depletion rate, respectively. $u^*(s)$ is the optimal power sourcing state and $\omega^*_{eng}$ is the optimal powersplit state. Variable $\lambda$ is the optimization co-state and it is regarded as an index ratio between FCR and EDR. The larger the value of $\lambda$ the faster the rate of fuel consumption; and the smaller the $\lambda$ the faster the battery SOC depletes. Given an admissible value of $\lambda$, the system domain TEMC optimization can be achieved over powersplit and power-sourcing state. However, the value of $\lambda$ is trip specific. According to TEMC control theory, an optimal value of $\lambda$ cannot be determined without trip information. Optimal $\lambda$ takes constant value with respect to constant drive power and vehicle state in any driving cycle or process. This result can be easily extended to driving patterns that embed uniform and consistent spatial domain drive power and vehicle speed distributions. As a result, the energy consumption property can be obtained for different driving patterns.

Figure 5A:
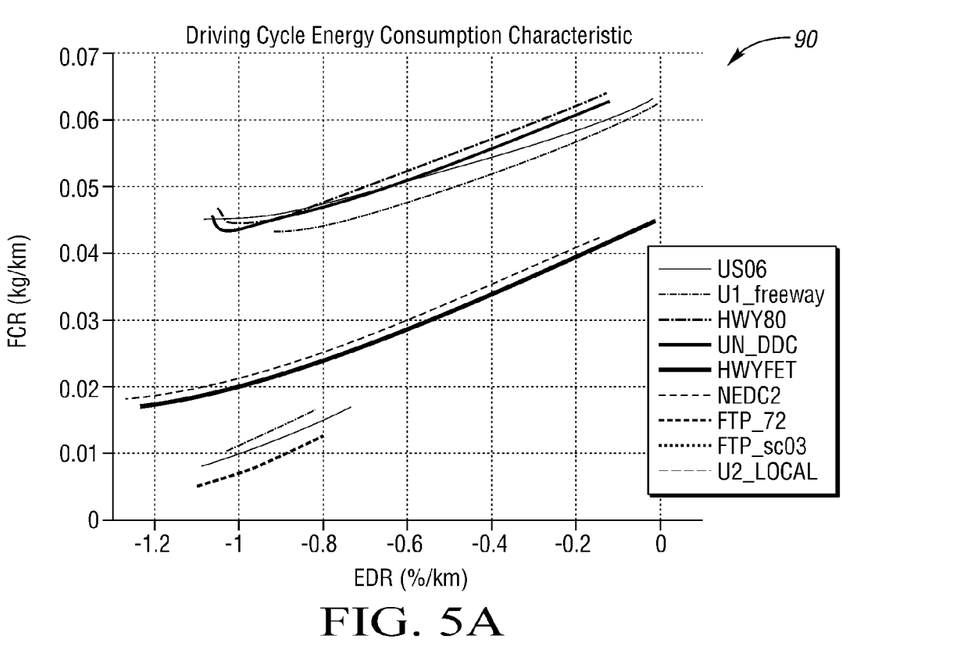
FIG. 5A illustrates a graph of energy consumption characteristic curves for different driving cycles.

FIG. 5A illustrates a graph 90 of energy consumption characteristic curves for the different driving cycles. From the energy consumption characteristic curves it can be observed that different driving cycles previously grouped into the same driving pattern class exhibit a similar energy consumption property. This confirms the effectiveness of the SNDP distribution based pattern classification concept. Furthermore, due to the equivalent battery efficiency, the energy consumption property, in addition to being related to SNDP, is also related to the battery SOC level.

Figure 5B:
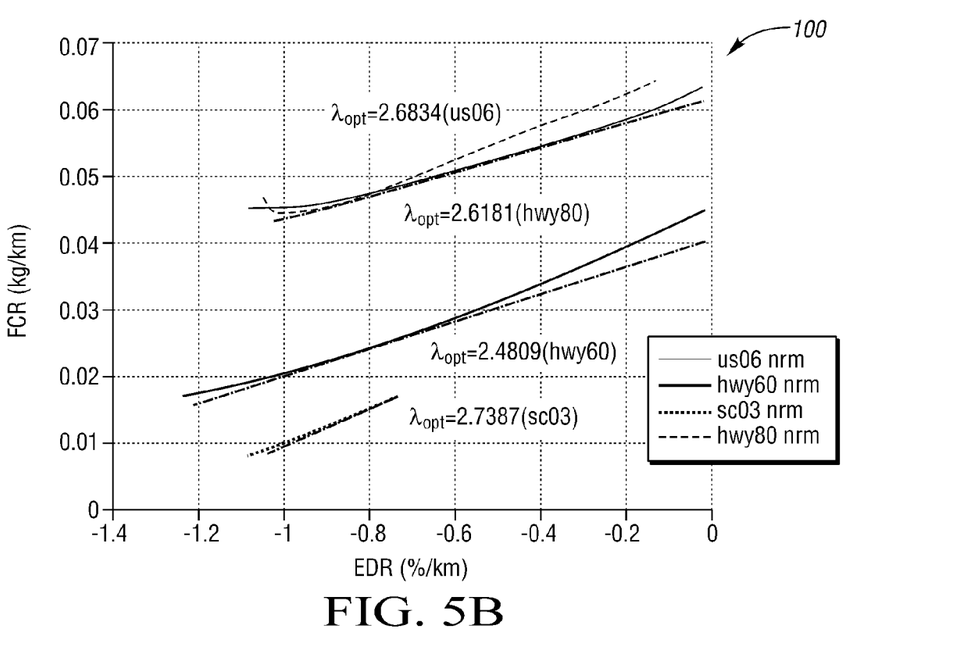
FIG. 5B illustrates a graph of energy consumption characteristic curve and optimal consumption ratio $\lambda_{OPT}$ for representative ones of different driving cycles.

Based on the previous result, for the limited driving patterns presented herein, the FTP-SC03, HWYFET, US06, and HWY80 driving cycles are used to represent low speed, mild high speed, high speed, and aggressive driving patterns, respectively. Their spatial domain energy consumption characteristics are separately plotted in graph 100 of FIG. 5B. When single driving pattern is considered in a driving process, the most optimal energy consumption state is the tangent point of the solid line to the dotted line for each types of driving patterns. The corresponding optimal λ set-points are also plotted in graph 100 of FIG. 5B. However, when a trip includes multiple parts of different types of driving patterns, λ is no longer unique, nor the optimal EDR to FCR state. The case becomes complicated and the optimal solution has to be programmed from element to element along a driving sequence in a global manner.

Based on the above energy consumption properties and battery SOC range, a driving pattern based SOC depletion profile is developed using dynamic programming (DP) for any trip including a sequence of identified driving patterns. That is, the preplanning process generates the battery SOC depletion profile using a driving pattern based DP algorithm. The objective of the DP energy consumption planning algorithm is to minimize overall trip fuel consumption. The DP algorithm also provides the feed-forward reference λset-point associated to the optimal SOC profile for the TEMC. The TEMC governs the energy consumption process by dictating the battery electric energy depleting rate in accordance with the SOC depletion profile.

Two programming examples will be demonstrated using the limited exemplary driving patterns identified herein. The first example is a driving process generated through cycle combination arbitrarily. The driving process includes eleven driving cycles sequentially as: [4 5 5 6 7 6 7 6 1 2 3] with the numerical code defined as: 1: FTP72; 2: FTP75; 3: FTT-SC03; 4: HWYFET; 5: NEDC2; 6: US06; 7: U1 freeway1. This trip is partitioned into three patterns in sequence as [mild high speed; high speed; low speed]. The optimal battery SOC depletion profile and reference optimal energy consumption ratio λ are generated from DP for this trip. The second example uses three consecutive days of a driver's daily commuting cycles. This trip is partitioned into five patterns in sequence by the driving pattern identification algorithm with the first, third, and fifth patterns associated to low speed driving pattern and the second and fourth patterns associated to high speed driving pattern. The preplanned SOC profile and optimal λ profile are generated from DP for this trip.

The driving pattern based energy consumption preplanning process treats the driving process in a consistent pattern as a unit. Thus, even though applying dynamic programming (DP) to plan on future energy consumption, only minimal level of the computing resource is needed as the optimization process does not involve detailed vehicle system and powertrain dynamics. The generation of the battery SOC depletion profile can be nearly instantaneously finished after a driving pattern sequence is obtained for a trip from other supporting functions. In general, after abundant driving patterns are identified for the driving pattern library, the finer the trip is partitioned and the accurate the sequence of driving patterns associated along the trip, the closer the resulted energy management performance is to a full-scale DP based control process.

Figure 6:
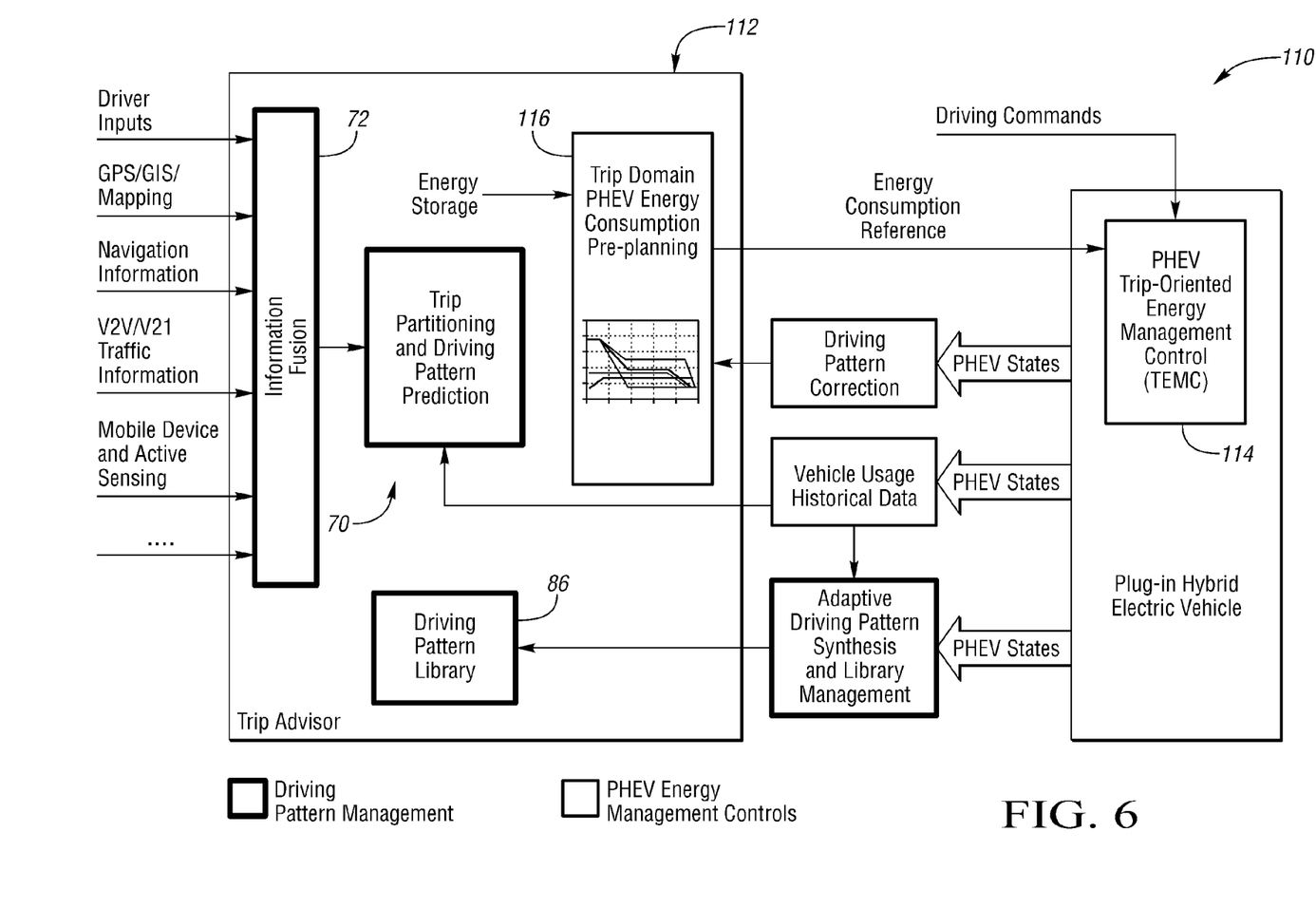
FIG. 6 illustrates a block diagram of the high level TEMC control architecture.

FIG. 6 illustrates a block diagram of the high level TEMC system 110. TEMC system 110 includes driving pattern based (trip-oriented) energy consumption pre-planner 112 and a trip-oriented energy management control (TEMC) 114. As shown in FIG. 6, pre-planner 112 includes a driving pattern predictor 70 and a battery SOC depletion profile generator 116. Battery SOC depletion profile generator 116 generates the optimal battery SOC depletion profile using DP for a trip of a PHEV including a sequence of driving patterns identified by driving pattern predictor 70. TEMC 114 controls energy usage of the PHEV traveling during the trip in accordance with the battery SOC profile.

TEMC system 110 solves the trip oriented energy management problem at two levels of optimization. At the higher level, i.e., the trip domain level, a global energy usage/consumption optimization is initially carried out such that the battery electric energy and the fuel usage is preplanned based on scalable trip foreknowledge and energy storage states (total fuel and usable battery depth of discharge). The generated trip domain SOC depletion profile serves as a feed-forward guideline for the PHEV online energy management control towards global energy economy improvement over a given driving schedule. The optimal preplanned λ profile also provides reference set-point for online battery depletion ratio adjustment. Next, in the lower level, the TEMC strategy regulates the λ set-point adaptively through the feedback control strategy such that the overall controlled energy consumption process achieves approximately the preplanned, theoretically optimal process. Furthermore, the feedback control also compensates the deviation from the real world driving behavior to the standard pattern identified.

A driving pattern based PHEV energy consumption preplanning process that supports trip-oriented PHEV energy management control in accordance with embodiments of the present invention has been described herein. The preplanning architecture and methodologies enable the energy management control to utilize scalable levels of available trip foreknowledge to optimize the onboard energy (fuel and electricity) usage. The preplanning process generates a battery SOC profile governing the energy consumption process along a trip using a driving pattern based dynamic programming (DP) algorithm. As detailed vehicle system and powertrain dynamics are not involved, the preplanning process is efficient and cost effective in information accessibility and computational resource requirement while achieving validated fuel economy improvement performance.

As described, embodiments of the present invention involve one or more of the following features: the definition and concept for SNDP calculated from driving cycles; using SNDP to capture driving style and to classify driving patterns; using scalable trip information to associate a trip to a sequence of driving patterns; using FCR vs. EDR energy consumption characteristic map to determine the energy consumption when driving under a certain driving pattern; using dynamic programming (DP) to generate optimal SOC profile for a sequence of driving pattern(s); and the structure of driving pattern based energy preplanning and controls.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
  a controller configured to control battery usage of a vehicle during a vehicle trip according to a battery state-of-charge (SOC) profile generated from dynamic programming of a fuel consumption rate and a battery electricity depletion rate based on a spatial domain normalized drive power (SNDP) distribution of a predefined driving pattern corresponding to the trip, the SNDP distribution being a drive power demand distribution of the driving pattern in a spatial domain with total propulsion energy for the trip is calculated by:

$$E_{prop} = \int_O^T P_{whl} dt = \int_O^S P_{sndp} ds,$$

wherein, $P_{whl}$ is the time domain drive power demand,
T is the total trip time duration,
S is distance until charge,
$P_{sndp}$ is the spatial domain normalized drive power.

2. The system of claim 1 wherein:
the driving pattern is representative of each of a plurality of driving processes having similar SNDP profiles.

3. The system of claim 1 wherein:
the controller is further configured to generate a library of driving patterns each having a corresponding SNDP distribution and each driving pattern associated with a driving process parameter.

4. The system of claim 3 wherein:
each driving pattern of the library of driving patterns is representative of a set of driving processes having similar SNDP profiles.

5. The system of claim 1 wherein:
the controller is further configured to select a driving pattern for each portion of the trip of the vehicle based on information associated with each portion of the trip, wherein each driving pattern has a corresponding SNDP distribution, and generate the battery SOC profile using dynamic programming with an energy consumption characteristic based on the SNDP distribution of each selected driving pattern and each portion of the trip associated with the selected driving pattern.

* * * * *